(12) United States Patent
Kawashima et al.

(10) Patent No.: US 9,243,660 B2
(45) Date of Patent: Jan. 26, 2016

(54) MAIN BEARING FOR CRANKSHAFT OF INTERNAL COMBUSTION ENGINE

(71) Applicant: DAIDO METAL COMPANY LTD., Nagoya (JP)

(72) Inventors: Yuki Kawashima, Inuyama (JP); Motohiko Koushima, Inuyama (JP)

(73) Assignee: Daido Metal Company Ltd., Nagoya (JP)

( * ) Notice: Subject to any disclaimer, the term of this patent is extended or adjusted under 35 U.S.C. 154(b) by 0 days.

(21) Appl. No.: 14/462,714

(22) Filed: Aug. 19, 2014

(65) Prior Publication Data
US 2015/0055900 A1 Feb. 26, 2015

(30) Foreign Application Priority Data
Aug. 26, 2013 (JP) .................. 2013-174713

(51) Int. Cl.
*F16C 9/02* (2006.01)
*F16C 33/10* (2006.01)
*F16C 3/14* (2006.01)
(Continued)

(52) U.S. Cl.
CPC .................. *F16C 9/02* (2013.01); *F16C 33/046* (2013.01); *F16C 33/10* (2013.01); *F16C 33/1065* (2013.01); *F16C 3/14* (2013.01); *F16C 2240/42* (2013.01)

(58) Field of Classification Search
CPC ............ F16C 9/02; F16C 9/04; F16C 17/002; F16C 33/046; F16C 33/1055; F16C 33/1065; F16C 33/1075; F16C 2240/42; F16C 2360/22; F16C 3/14; F01M 2011/026
USPC .................. 384/286, 288, 291–292, 294, 430
See application file for complete search history.

(56) References Cited

U.S. PATENT DOCUMENTS 3,625,580 A * 12/1971 DeHart et al. ................. 384/288
4,325,589 A * 4/1982 Hirt ............................... 384/375
(Continued)

FOREIGN PATENT DOCUMENTS

DE 102007046010 A1 * 4/2008 .............. F16C 33/10
JP 04-219521 8/1992
(Continued)

OTHER PUBLICATIONS

Office Action issued Jun. 18, 2015 in corresponding priority Japanese patent application Serial No. JP 2013-174713 (three pages) (English translation not available).

*Primary Examiner* — Marcus Charles
(74) *Attorney, Agent, or Firm* — Harness, Dickey & Pierce, PLC (57) ABSTRACT

A main bearing for a crankshaft of an internal combustion engine has first and second half bearings forming an axial groove on an inner circumferential surface of a butting portion. Each half bearing has a main cylinder portion including a central portion, and crush relief portions each extending toward the central portion from an end surface of the half bearing with a center angle of 3° to 15°. A plurality of crush relief grooves are formed in each crush relief portion in the circumferential direction to communicate with the axial groove. An oil groove is formed in the circumferential direction on an inner circumferential surface of the first half bearing. The second half bearing has a transition region having an inward protruding curved surface a wall thickness of which becomes thinner toward the crush relief portion from the main cylinder portion.

9 Claims, 10 Drawing Sheets

(51) Int. Cl.
*F16C 9/04* (2006.01)
*F16C 33/04* (2006.01)

(56) References Cited

U.S. PATENT DOCUMENTS

| | | | | |
|---|---|---|---|---|
| 4,461,585 | A * | 7/1984 | Mahrus et al. | 384/288 |
| 5,181,785 | A * | 1/1993 | Bencini et al. | 384/288 |
| 6,082,904 | A * | 7/2000 | Ono et al. | 384/291 |
| 6,176,621 | B1 * | 1/2001 | Naitoh et al. | 384/291 |
| 7,234,870 | B2 * | 6/2007 | Kitahara et al. | 384/288 |
| 8,708,566 | B2 * | 4/2014 | Otsuki et al. | 384/288 |
| 2005/0047689 | A1 * | 3/2005 | Yamazaki et al. | 384/288 |
| 2005/0196084 | A1 | 9/2005 | Kitahara et al. | |
| 2008/0187259 | A1 | 8/2008 | Ishigo et al. | |
| 2010/0046869 | A1 * | 2/2010 | Matsuyama | 384/288 |
| 2011/0058761 | A1 * | 3/2011 | Ishigo et al. | 384/288 |
| 2011/0058762 | A1 * | 3/2011 | Ishigo et al. | 384/430 |
| 2014/0064644 | A1 * | 3/2014 | Kawashima et al. | 384/288 |

FOREIGN PATENT DOCUMENTS

| | | | |
|---|---|---|---|
| JP | H04-300027 | 10/1992 | |
| JP | 08-277831 | 10/1996 | |
| JP | 2001-050252 | 2/2001 | |
| JP | 2005-249024 | 9/2005 | |
| JP | 2008-082355 | 4/2008 | |
| JP | 2011-058568 | 3/2011 | |
| WO | WO 2004038188 A1 * | 5/2004 | F16C 9/02 |

* cited by examiner

MAIN BEARING FOR CRANKSHAFT OF INTERNAL COMBUSTION ENGINE

BACKGROUND OF THE INVENTION (1) Field of the Invention

The invention of the present application relates to a main bearing for supporting a crankshaft of an internal combustion engine.

(2) Description of the Related Art

A crankshaft of an internal combustion engine is supported at a journal section thereof by a cylinder block lower part of the internal combustion engine via a main bearing made of a pair of half bearings. For the main bearing, a lubricating oil that is discharged by an oil pump is fed into a lubricating oil groove that is formed along an inner circumferential surface of the main bearing through a through-port that is formed in a wall of the main bearing from an oil gallery that is formed in a cylinder block wall. Further, a first lubricating oil path is formed by being penetrated in a diameter direction of the journal section, and both end openings of the first lubricating oil path communicate with the lubricating oil groove of the main bearing. Furthermore, a second lubricating oil path passing through a crank arm section is formed by branching from the first lubricating oil path in the journal section, and the second lubricating oil path communicates with a third lubricating oil path that is formed by being penetrated in a diameter direction of a crankpin. In this manner, the lubricating oil which is fed into the lubricating oil groove formed on the inner circumferential surface of the main bearing through the through-port from the oil gallery in the cylinder block wall passes through the first lubricating oil path, the second lubricating oil path and the third lubricating oil path, and is supplied between a sliding surface of the crankpin and a connecting rod bearing from a discharge port that is opened in a terminal end of the third lubricating oil path (for example, see JP-A-8-277831).

Conventionally, as the main bearing and the connecting rod bearing, sliding bearings each configured by a pair of half bearings have been adopted, and in each of the sliding bearings, a so-called crush relief is formed adjacently to abutment surfaces of the half bearings. A crush relief corresponds to a gap region that is formed in a space from a shaft to be supported by forming a wall thickness of a region adjacent to a circumferential end surface of a half bearing so that the wall thickness becomes thinner toward the circumferential end surface (for example, see SAE J506 (item 3.26 and item 6.4), DIN1497 (section 3.2), JIS D3102). The crush relief is formed with an objective of absorbing a positional displacement and deformation of the butting surfaces of the half bearings in a state in which a pair of half bearings are assembled (For example, see JP-A-4-219521).

Meanwhile, in recent years, a bearing in which a circumferential groove is formed by boring an inner circumferential surface of a bearing circumferential end portion is proposed in order to decrease the leakage amount of the lubricating oil from the bearing end portion in response to downsizing of a lubricating oil supplying oil pump (JP-A-2011-58568).

SUMMARY OF THE INVENTION

Here, an operation of the prior art will be described with use of FIGS. 15A and 15B, and FIGS. 16A and 16B. As described above, when an inlet opening 6c for a lubricating oil in the surface of a journal section 6 is located at a main cylinder surface 171 of a half bearing 142, a gap between the surface of the journal section 6 and the main cylinder surface 171 of the half bearing 142 is narrow. Therefore, the inlet opening 6c is closed by the main cylinder surface 171 of the half bearing 142, and by the influence of a centrifugal force by rotation of the crankshaft, so that the pressure of the lubricating oil in the vicinity of the inlet opening 6c in the lubricating oil path 6a is in an extremely high state.

Figure 16A:
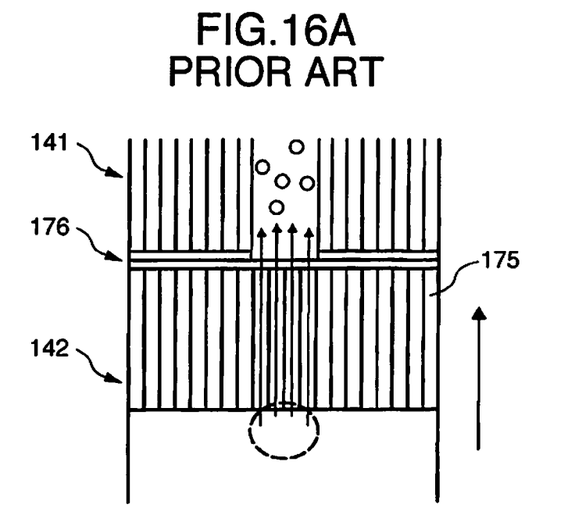
FIG. 16A is a view seen from the bearing inner side for explaining the operation of the main bearing of the prior art.
Figure 16B:
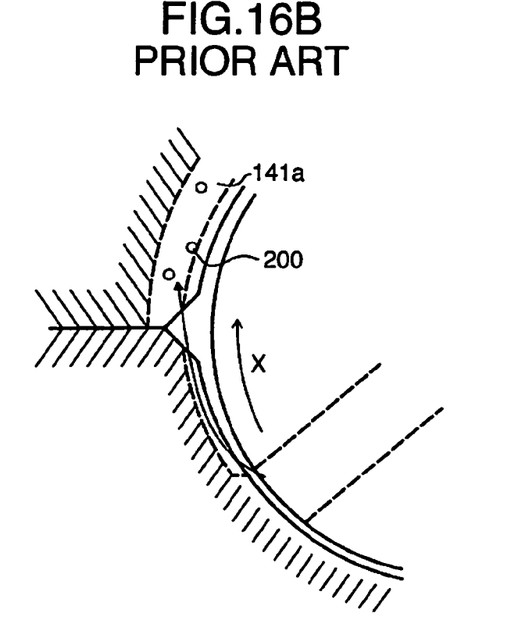
FIG. 16B is a front view explaining the operation of the main bearing of the prior art.

As shown in FIGS. 16A and 16B, at the moment when the inlet opening 6c for the lubricating oil in the surface of the journal section 6 and the crush relief 170 start communication, an jet flow (back-flow) of the oil to a relief gap side from the lubricating oil path 6a is formed instantaneously due to the difference between the pressure of the lubricating oil inside the lubricating oil path 6a, and the pressure of the lubricating oil in the gap (the relief gap) between the crush relief 170 and the surface of the journal section 6.

On that occasion, the jet flow mainly flows into only crush relief grooves 175 that communicate with the inlet opening 6c for the lubricating oil, because the relief gap in the region of the circumferential end portion of the crush relief 170 is narrow. Therefore, the jet flow of the lubricating oil is extremely strong.

Subsequently, the jet flow of the high-pressure oil that flows into the crush relief grooves 175 moves straight ahead in the crush relief grooves 175, passes over an axial groove 176 by an inertia force, and is concentratedly fed into an oil groove 141a of the other half bearing 141 while remaining in a high-pressure state.

In that case, as shown in FIGS. 16A and 16B, the jet flow of the high-pressure oil goes into the oil groove 141a of the other half bearing 141, and at the same time, the pressure of the oil rapidly reduces. Therefore, a vacancy (a bubble) 200 is easily generated in the oil. Generation spots of the vacancies (the bubbles) concentrate on the vicinity of the circumferential end portion on the rear side in the shaft rotation direction of the oil groove 141a of the half bearing 141, and therefore, that area is a region where rupture, and collapse of the vacancies (the bubbles) concentratedly occur. Due to the impact thereof, cavitation erosion easily occurs at the inner circumferential surface of the oil groove 141a of the half bearing 141.

In JP-A-2001-50252, an extension groove which has a width narrower than the diameter of the inlet opening is provided to continue to the oil groove of the half bearing on the lower side. Therefore, at the moment when the extension groove and the inlet opening start communication, and at the moment when the extension groove and the inlet opening end communication, a part of the inlet opening is closed by the bearing inner surface, and the inflow amount of the oil to the inlet opening becomes small with respect to the inflow amount of the oil at the time of the inlet opening communicating with the oil groove. This makes the change of the inflow amount of the oil to the inlet opening mild (paragraphs 0011, 0029 and the like). This intends to prevent cavitation damage of the connecting rod bearing as a result that vacancies (bubbles) caused by the cavitation phenomenon are generated in the oil in the internal oil path of the journal and are fed to the connecting rod bearing side.

However, in JP-A-2001-50252, consideration is not given to the high-pressure oil that instantaneously jets and flows backward from the inlet port opening. When the extension groove on the front side in the shaft rotation direction of the half bearing on the lower side and the journal inlet opening start communication, all of the high-pressure oil that instantaneously jets and flows backward from the inlet opening is fed into the oil groove.

Accordingly, each of the prior arts is in the situation in which cavitation erosion easily occurs concentratedly in the oil groove of the half bearing on the upper side.

An object of the invention of the present application is to provide a main bearing for a crankshaft of an internal combustion engine that is excellent in restraining cavitation erosion.

In order to attain the above described object, according to one aspect of the invention of the present application, there is provided a main bearing for rotatably supporting a journal section of a crankshaft of an internal combustion engine, the journal section comprising a cylindrical body part, a lubricating oil path extending to penetrate the cylindrical body part, and two inlet openings of the lubricating oil path that are formed on an outer circumferential surface of the cylindrical body part, wherein the main bearing comprises first and second half bearings which are combined into a cylindrical shape by butting respective circumferential end surfaces, the first and second half bearings are configured to form an axial groove extending through an entire length of the main bearing in an axial direction on an inner circumferential surface side of each butting portion when the first and second half bearings are combined, each half bearing has a main cylinder portion including a central portion of the half bearing in the circumferential direction, and crush relief portions which are formed throughout an entire length of the half bearing in the axial direction at both end portions of the half bearing in the circumferential direction so that a wall thickness of the crush relief portion becomes thinner than that of the main cylinder portion, each crush relief portion extending from the end surface of the half bearing in the circumferential direction toward the central portion in the circumferential direction with a center angle not less than 3° and not more than 15°, a plurality of crush relief grooves extending in the circumferential direction through an entire length of the crush relief portion are formed in each crush relief portion to communicate with the axial groove, an oil groove is formed only on an inner circumferential surface of the first half bearing among the first and second half bearings, the oil groove extending in the circumferential direction through at least an entire length of the main cylinder portion of the first half bearing, and the second half bearing further has a transition region formed between at least the crush relief portion on a front side of the crankshaft in a rotation direction and the main cylinder portion in such a manner that a wall thickness of the transition region becomes thinner toward the crush relief portion from the main cylinder portion, the transition region comprising an inward protruding curved surface in a protruding shape protruding inward in a radial direction seen from the axial direction of the half bearing.

In the above described main bearing, in the crush relief portion connecting to the transition region, a depth in a radial direction in the connecting position is preferably 0.002 mm to 0.030 mm.

Further, in the above described main bearing, in the transition region, a length in the circumferential direction is preferably 1 mm to 4 mm.

Further, in the above described main bearing, in each of the crush relief grooves, a depth in the radial direction is preferably 1 mm to 20 μm, and a width in the axial direction is preferably 0.05 mm to 0.5 mm.

Further, in the above described main bearing, when the first and second half bearings are combined, the respective crush relief grooves which are formed in the crush relief portions of the first half bearing are preferably displaced in the axial direction by an amount exceeding zero at a minimum and less than the width of the crush relief groove at a maximum, with respect to the respective crush relief grooves which are formed in the crush relief portions of the second half bearing.

Further, in the above described main bearing, in each of the axial grooves, a depth in the radial direction is preferably 0.1 mm to 1 mm, and a width in the circumferential direction is preferably 0.3 mm to 2.0 mm.

Figure 17:
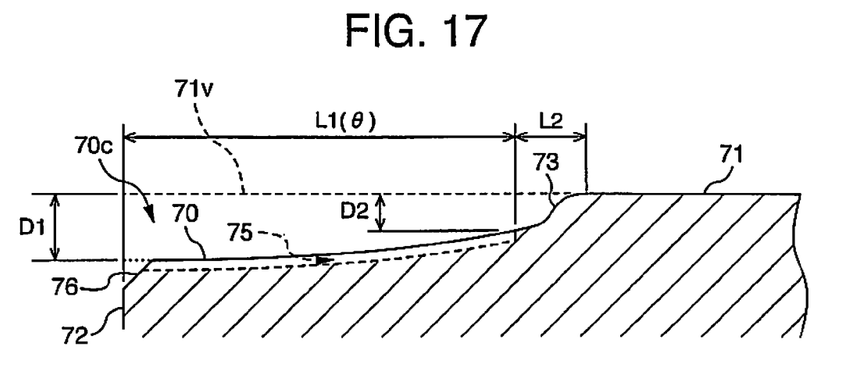
FIG. 17 is a development explaining specific dimensions by developing a main cylinder portion in a planar fashion in regard with the shape in the vicinity of the crush relief and far from the crush relief.

Further, in the above described main bearing, the transition region may have the inward protruding curved surface on a side far from the crush relief portion, and may have an outward protruding curved surface in a protruding shape protruding outward in the radial direction on a side near to the crush relief portion. See FIG. 17.

Further, in the above described main bearing, at least a circumferential end portion of the oil groove on a front side in the rotation direction of the crankshaft may be located in the crush relief portion.

Figure 13A:
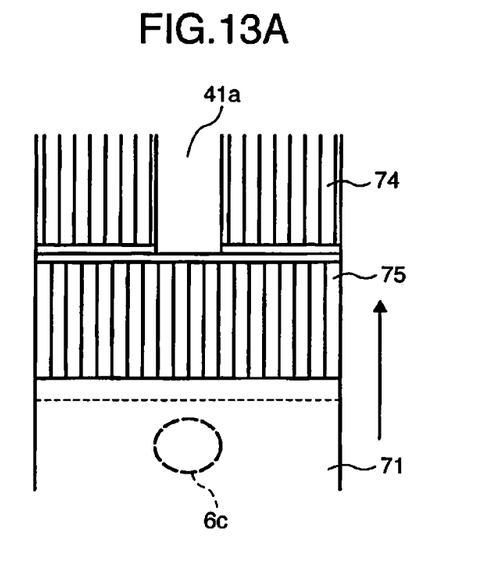
FIG. 13A is a view seen from the bearing inner side for explaining an operation of a main bearing of the invention of the present application.
Figure 13B:
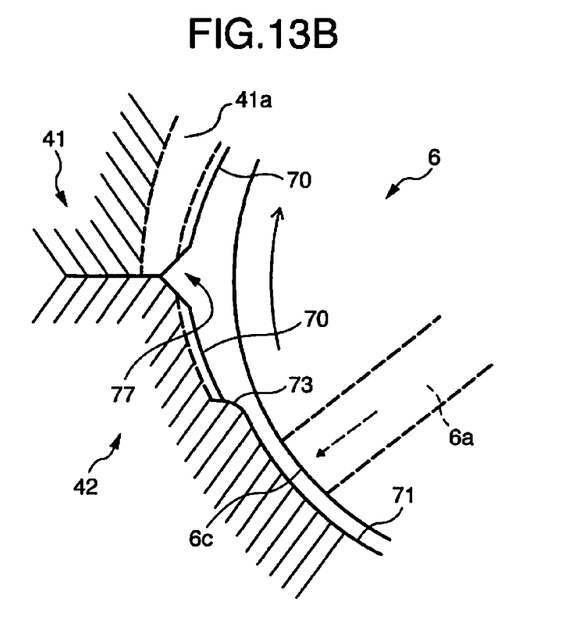
FIG. 13B is a front view for explaining the operation of the main bearing of the invention of the present application.

As shown in FIGS. 13A and 13B, in the invention of the present application, an inlet opening 6c is closed by a main cylinder surface 71 of a half bearing 42 while the inlet opening 6c for the lubricating oil in the surface of the journal section 6 is located at the main cylinder surface 71 (the inner surface of the main cylinder portion) of the half bearing 42, but since the lubricating oil in a lubricating oil path 6a is pressed toward the inlet opening 6c side by the centrifugal force by rotation of the crankshaft, the pressure of the lubricating oil in the vicinity of the inlet opening 6c in the lubricating oil path 6a is in an extremely high state, especially when the rotational speed of the crankshaft is high in an operation of the internal combustion engine.

Figure 14A:
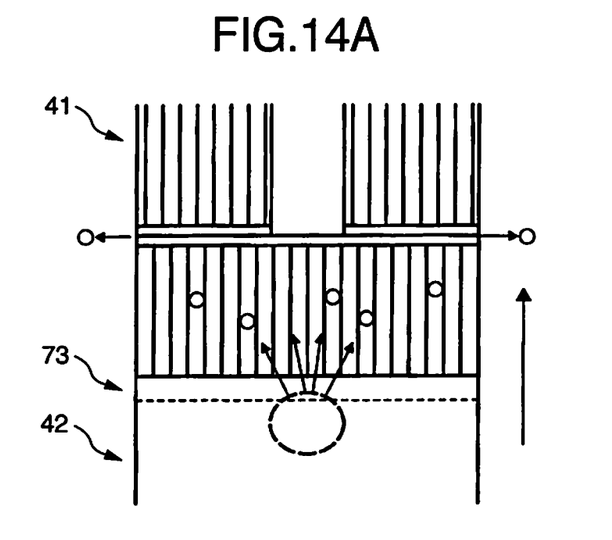
FIG. 14A is a view seen from the bearing inner side for explaining the operation of the main bearing of the invention of the present application.
Figure 14B:
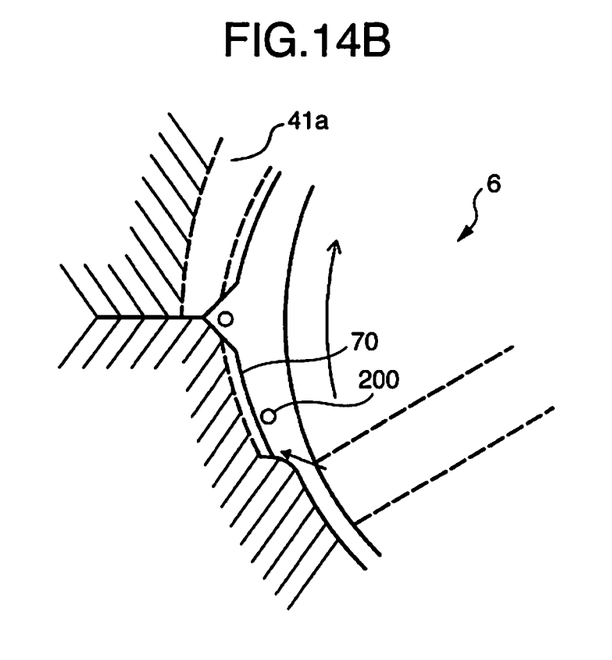
FIG. 14B is a front view for explaining the operation of the main bearing of the invention of the present application.
Figure 15A:
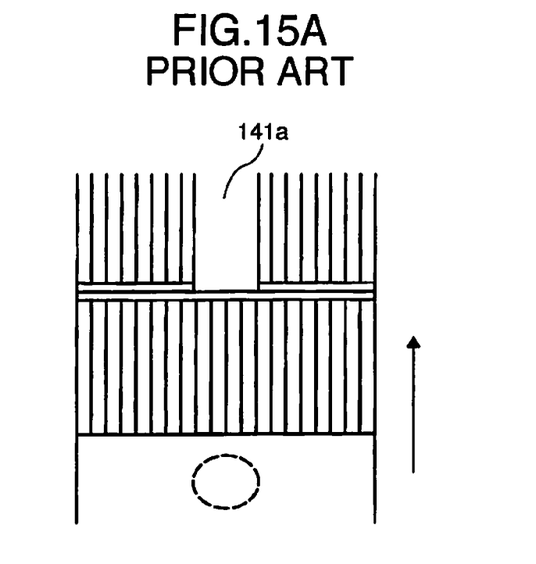
FIG. 15A is a view seen from a bearing inner side for explaining an operation of a main bearing of a prior art.
Figure 15B:
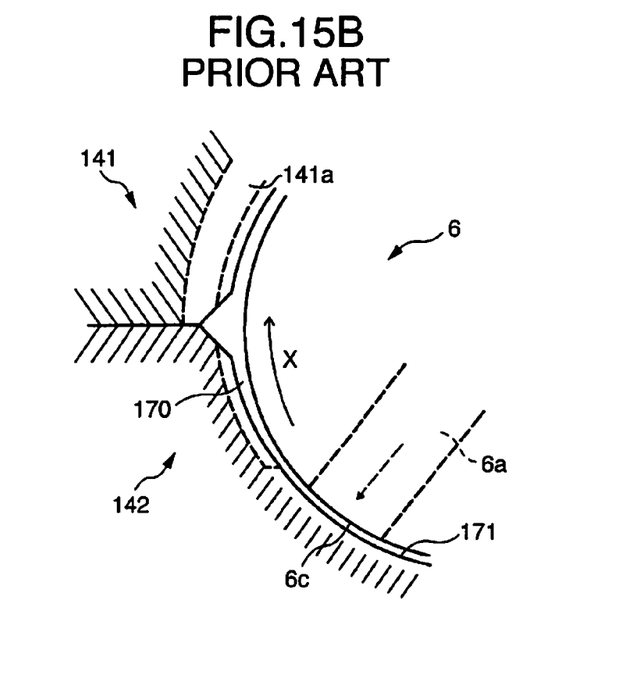
FIG. 15B is a front view explaining the operation of the main bearing of the prior art.

However, as shown in FIGS. 14A and 14B, at the moment when the inlet opening 6c of the lubricating oil path 6a in the surface of the journal section 6 and the transition region 73 start communication, the high-pressure lubricating oil that instantaneously jets and flows backward into the relief gap from the lubricating oil path 6a disperses and flows into the relief gap due to the difference between the pressure of the lubricating oil inside the lubricating oil path 6a and the pressure of the lubricating oil in a gap (a relief gap) among a crush relief portion 70, a transition region 73 and the surface of the journal section 6. Since the half bearing 42 of the invention of the present application has the transition region 73, the jet flow of the high-pressure lubricating oil disperses and flows in the bearing width direction of the relief gap.

When the lubricating oil which has a high pressure in the lubricating oil path 6a flows into the relief gap (the gap between the surface of the crush relief portion and the surface of the journal section) of the half bearing 42, the pressure of the lubricating oil reduces, and a cavitation phenomenon in which vacancies (bubbles) 200 are generated in the lubricating oil sometimes occurs.

In the invention of the present application, the lubricating oil that has a high pressure disperses and flows into the relief gap of the half bearing 42, and therefore, generation of vacancies (bubbles) disperses in the relief gap of the half bearing 42 on the lower side.

When the vacancies (bubbles) generated in the lubricating oil rapture and collapse, a force (an impact force) occurs, and if the spots where vacancies (bubbles) rapture and collapse concentrate on a certain site in the relief gap of the half bearing 42, the surface of the crush relief portion of the half bearing 42 is sometimes damaged (cavitation erosion).

In the invention of the present application, the generation spots of vacancies (bubbles) disperse in the relief gap as described above, and the spots where the vacancies (the bubbles) rapture also disperse in the relief gap. Therefore, in the crush relief surface of the half bearing 42, cavitation erosion hardly occurs.

Further, the vacancies (the bubbles) that do not collapse in the relief gap of the half bearing 42 are guided to the crush relief grooves 75 together with the lubricating oil, are fed to the axial groove 77, and are further discharged to an outside from both the end portions in the bearing width direction of the axial groove 77 together with the lubricating oil. Therefore, the vacancies (the bubbles) are hardly fed to the relief gap of the half bearing 41.

Accordingly, in the half bearing 42 of the invention of the present application, the lubricating oil which has a high pressure in the lubricating oil path is not concentratedly fed into the oil groove 41a of the other half bearing 41, and the problem hardly arises that cavitation erosion occurs to the inner circumferential surface of the oil groove 41a of the half bearing 41.

Further, according to the invention of the present application, the formation range of the crush relief portion is at a circumferential angle (θ) of 3° to 15° inclusive, from the circumferential end surface of the half bearing. The reason thereof is that if the formation range of the crush relief is from the circumferential end surface of the half bearing to less than 3° in the circumferential angle (θ), the capacity of the relief gap is so small that the oil flowing out of the inlet opening 6c hardly disperses and flows out to the relief gap, whereas if the circumferential angle (θ) exceeds 15°, oil including vacancies (bubbles) passes over the axial groove 77 and easily advances into the inner circumferential surface of the other half bearing, and the leakage amount of the oil to the outside from the half bearings 41 and 42 also increases.

In more detail, oil flows (oil flows shown by the arrows) that flow into the relief gap from the transition region 73 in FIG. 14A collide with an oil flow that flows to the relief gap from a gap side between the main cylinder portion and the journal surface not illustrated, accompanies the journal surface and moves straight ahead in the circumferential direction of the bearing in such a manner as to intersect one another in the relief gap. Therefore, in the relief gap, the flow of the oil which flows in the circumferential direction of the bearing is weakened. If the formation range of the crush relief exceeds 15° in the circumferential angle (θ), in the vicinity of the circumferential end portion of the half bearing in the relief gap, the oil which is decreased in the speed of straight movement in the circumferential direction at the upstream side of the relief gap increases in the speed of straight movement in the circumferential direction of the bearing again, until the oil accompanies the journal surface and is fed to the vicinity of the circumferential end portion of the half bearing in the relief gap, whereby the oil including vacancies (bubbles) passes over the axial groove and easily advances into the inner circumferential surface of the other half bearing.

DETAILED DESCRIPTION OF THE INVENTION

Hereinafter, embodiments of the invention of the present application will be described with reference to the drawing. Note that in order to facilitate the understanding of the embodiments, crush reliefs are illustrated by being emphasized in the drawing.

Embodiments

Entire Configuration of Bearing Device

Figures 1, 2:
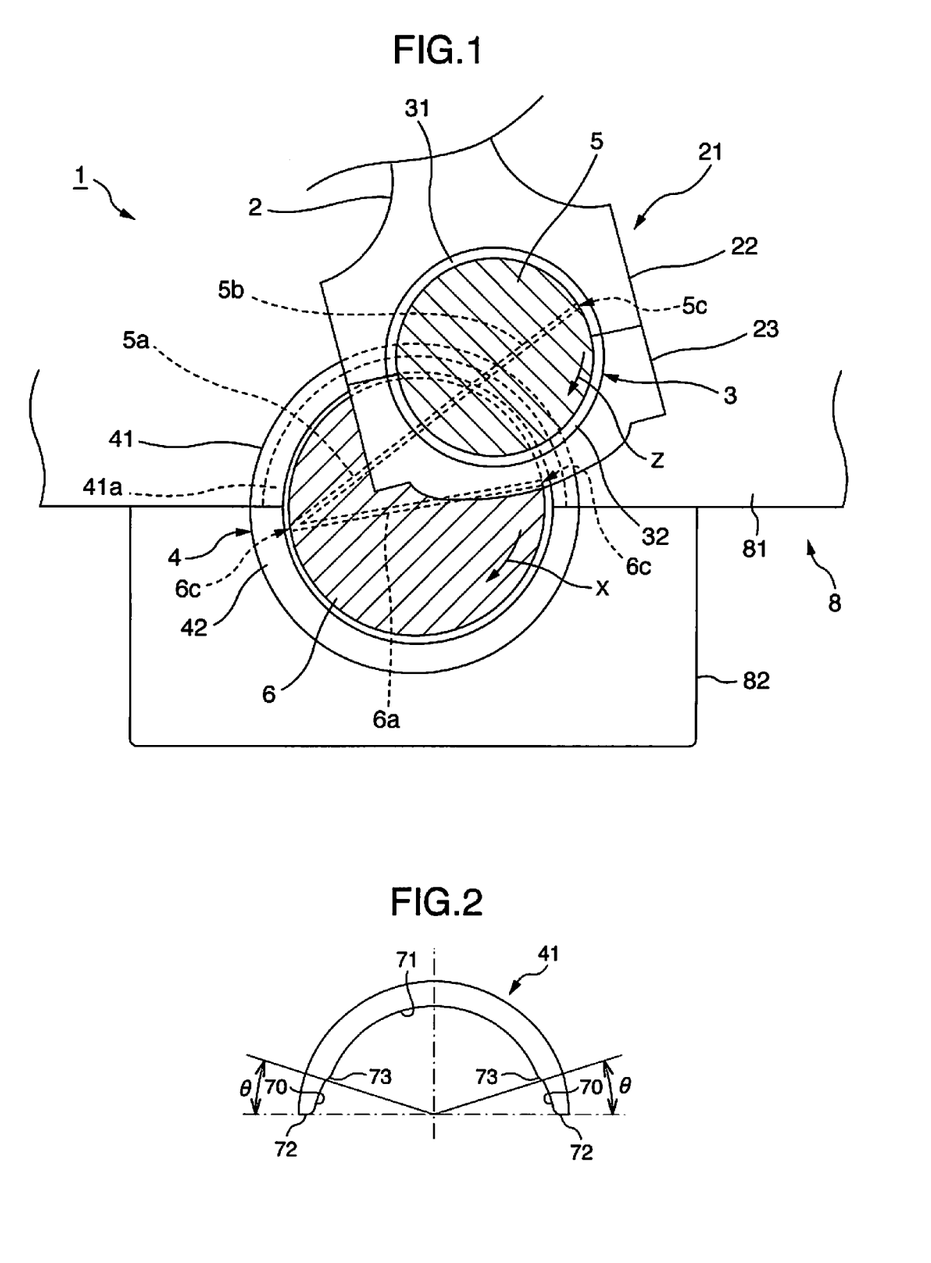
FIG. 1 is a sectional view of a crankshaft of an internal combustion engine cut at a journal section and a crankpin section.
FIG. 2 is a front view of one half bearing according to an embodiment of the invention of the present application.

As shown in FIG. 1, a bearing device 1 of each of the present embodiments includes a journal section 6 that is supported by a lower part of a cylinder block 8, a crankpin 5 that is formed integrally with the journal section 6 and revolves around the journal section 6, and a connecting rod 2 that transmits reciprocal movement from an internal combustion engine to the crankpin 5. The bearing device 1 further includes a main bearing 4 that rotatably supports the journal section 6, and a connecting rod bearing 3 that rotatably supports the crankpin 5, as sliding bearings that support a crankshaft.

Note that while the crankshaft has a plurality of journal sections 6 and a plurality of crankpins 5, explanation will be made by illustrating one of the journal sections 6 and one of the crankpins 5 here for convenience of explanation. In FIG. 1, positional relation in a depth direction of the page is such that the journal section 6 is on a back side of the page, and the crankpin 5 is on a front side thereof.

The journal section 6 is pivotally supported by a cylinder block lower part 81 of an internal combustion engine via the main bearing 4 that is configured by a pair of half bearings 41 and 42. In the half bearing 41 which is on an upper side in FIG. 1, an oil groove 41a is formed throughout an entire length of an inner circumferential surface. Further, the journal section 6 has a lubricating oil path 6a that penetrates in the diameter direction, and when the journal section 6 rotates in an arrow X direction, inlet openings 6c at both ends of the lubricating oil path 6a alternately communicate with the oil groove 41a of the main bearing 4.

The crankpin 5 is pivotally supported by a large end portion housing 21 (a rod side large end portion housing 22 and a cap side large end portion housing 23) of the connecting rod 2 via the connecting rod bearing 3 which is configured by a pair of half bearings 31 and 32.

As described above, for the main bearing 4, a lubricating oil that is discharged by an oil pump is fed into the oil groove 41a which is formed along the inner circumferential surface of the main bearing 4 through a through-port formed in a wall of the main bearing 4 from an oil gallery formed in a cylinder block wall.

Furthermore, the first lubricating oil path 6a is formed to penetrate in the diameter direction of the journal section 6, and the inlet opening 6c of the first lubricating oil path 6a communicates with the lubricating oil groove 41a. A second lubricating oil path 5a that branches from the first lubricating oil path 6a of the journal section 6 and passes through a crank arm section (not illustrated) is formed, and the second lubricating oil path 5a communicates with a third lubricating oil path 5b that is formed to penetrate in a diameter direction of the crankpin 5.

In this manner, the lubricating oil passes through the first lubricating oil path 6a, the second lubricating oil path 5a and the third lubricating oil path 5b, and is supplied to a gap that is formed between the crankpin 5 and the connecting rod bearing 3, from a discharge port 5c at an end portion of the third lubricating oil path 5b.

Configuration of Half Bearing

Figure 5:
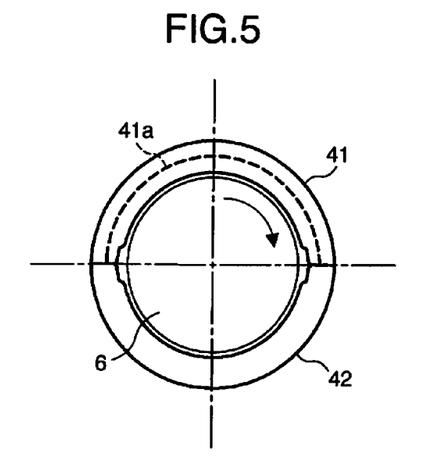
FIG. 5 is a front view of a main bearing in a state in which a pair of half bearings are assembled.

The main bearing 4 of the present embodiment is formed by butting end surfaces in a circumferential direction of the pair of half bearings 41 and 42, and assembling the pair of half bearings 41 and 42 into a cylindrical shape as a whole (see FIG. 5). Each half bearing 41 (or 42) is formed into a semi-cylindrical shape by a bimetal formed by bonding a bearing alloy thinly on a steel plate as shown in FIG. 2. The half bearing 41 includes a main cylinder portion 71 that is formed by including a central portion in a circumferential direction, crush relief portions 70 and 70 that are formed at both end portions in the circumferential direction, and transition regions 73 and 73 that are located between the main cylinder portion 71 and the crush relief portions 70 and 70, and are formed in such a manner that wall thicknesses thereof become thinner toward the crush relief portions 70 and 70.

Embodiment 1

Figure 3:
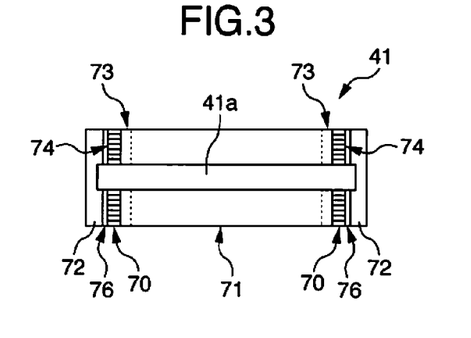
FIG. 3 is a bottom view of the one half bearing according to the embodiment of the invention of the present application.

As is understood from FIGS. 3 and 5, the oil groove 41a which is formed on the inner circumferential surface of the half bearing 41 is formed to extend through the central portion in the circumferential direction, and open to both end surfaces 72 in the circumferential direction of the half bearing 41. A depth of the oil groove 41a is constant throughout an entire length in the circumferential direction of the oil groove 41a. Note that in the main cylinder portion 71, the depth of the oil groove 41a mentioned here refers to a depth to an oil groove bottom surface from an inner circumferential surface of the main cylinder portion 71, whereas in the crush relief portion 70 and the transition region 73, the depth of the oil groove 41a refers to a depth from a virtual inner circumferential surface 71v in the case in which the crush relief portion 70 and the transition region 73 are not formed.

As is understood from FIG. 3, the oil groove 41a is disposed in a center of a width in an axial direction of the half bearing 41. A through-port (not illustrated) that penetrates through the half bearing 41 in a radial direction is formed in a bottom portion of the oil groove 41a, and the oil is supplied into the oil groove 41a through the through-port from the oil gallery in the wall of the cylinder block. The width of the oil groove 41a depends on the specifications of an internal combustion engine, and is about 4 to 7 mm in the case of a compact internal combustion engine for a passenger car, for example, and a depth of the oil groove 41a is about 0.5 to 1.5 mm.

Note that the oil groove 41a is not limited to embodiment 1, and the width and the depth of the oil groove can be formed to be maximum in a vicinity of the central portion in the circumferential direction of the half bearing 41, and become gradually smaller toward the circumferential end surface 72 side of the half bearing 41, or can be formed to be minimum in the vicinity of the central portion in the circumferential direction of the half bearing 41, and become gradually larger toward the circumferential end surface 72 side of the half bearing 41.

Note that in the invention of the present application, the transition region 73 on a front side in the rotational direction of the crankshaft, of the half bearing 42 on a lower side in which the oil groove is not an essential component is an essential component, whereas the transition region 73 on a rear side is not an essential component, and the transition region 73 on the front side in the rotation direction of the crankshaft, of the half bearing 41 on the upper side having the oil groove and the transition region 73 on the rear side are not essential components, either.

In embodiment 1, the half bearings 41 and 42 include the transition regions 73 on both of the front side and the rear side. Unlike embodiment 1, on the rear side in the rotational direction of the crankshaft 6, of the half bearing 42, the crush relief portion 70 and the main cylinder portion 71 may be formed to be directly connected, without forming the transition region 73. Further, without forming the transition regions 73 in the half bearing 41, the crush relief portions 70 and the main cylinder portion 71 may be formed to be directly connected. Note that "the transition region 73 on the front side in the rotation direction of the crankshaft 6" means the transition region 73 which an optional point on a surface of the journal section 6 which is rotating passes at the second time, out of the transition regions 73 located in the vicinities of both ends when attention is paid to the one half bearing 41 or 42.

If the transition regions 73 are formed on both the front side and the rear side in the rotation direction of the crankshaft in the half bearing 42, commonality of machining steps for the inner circumferential surface at both end portions in the circumferential direction of the half bearing 42 can be achieved, and if the transition region 73 is formed in the half bearing 41, commonality of machining steps for the inner circumferential surfaces of the half bearing 41 and the half bearing 42 can be also achieved.

Figure 6:
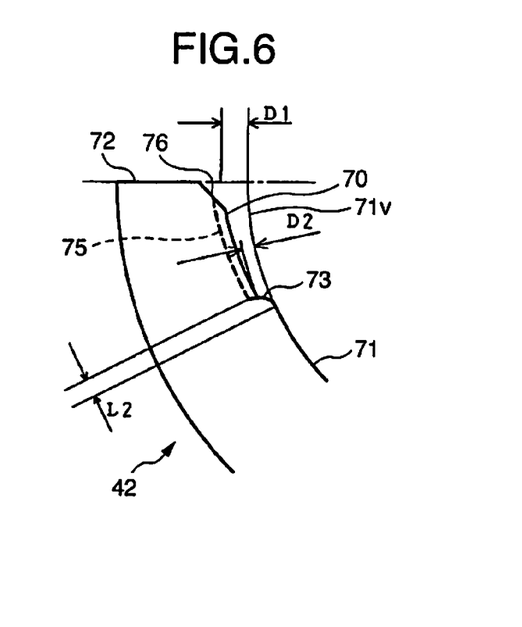
FIG. 6 is an enlarged front view explaining a shape in a vicinity of a crush relief.
Figure 7:
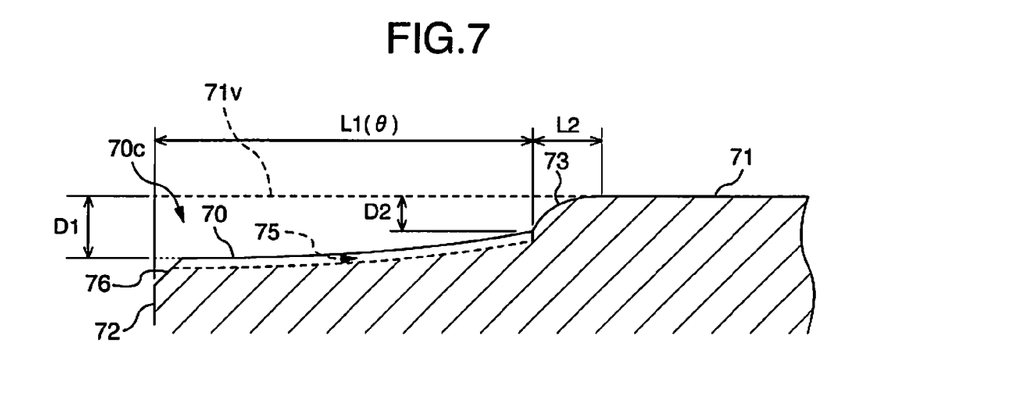
FIG. 7 is a development explaining specific dimensions by developing a main cylinder portion in a planar fashion in regard with the shape in the vicinity of the crush relief.

The main cylinder portion 71 has a semi-cylindrical surface that occupies most part of the inner circumferential surface of the half bearing 41 (or 42), and the semi-cylindrical surface forms a main sliding surface between the semi-cylindrical surface and a mating shaft. The transition region 73 which has a wall thickness gradually decreasing toward the crush relief portion 70 is provided adjacently to the main cylinder portion 71, as shown in FIGS. 6 and 7. In other words, in the transition region 73, an inclined curved surface is formed to approach the mating shaft side from an inner surface of the crush relief portion 70 toward an inner surface of the main cylinder portion 71.

The transition region 73 seen from the axial direction of the half bearing 41 (or 42) is made of an inward protruding curved surface that protrudes inward in a radial direction of the half bearing 41 (or 42). Namely, an inclination of the inclined curved surface of the transition region 73 to the virtual inner circumferential surface 71v of the half bearing 41 seen from the axial direction of the half bearing 41 (or 42) becomes the largest at a position connecting to the crush relief portion 70, and becomes the smallest at a position connecting to the main cylinder portion 71, and the transition region 73 connects to the main cylinder portion 71 smoothly.

Note that the transition region may be formed of a flat surface, and in that case, a corner portion (a corner edge portion) is formed at a connection spot of the main cylinder portion 71 and the transition region. The corner portion contacts a journal portion surface of the crankshaft, and a damage easily occurs. The transition region is formed by the inclined curved surface as in the invention of the present application, whereby such a problem hardly arises.

Further, an inner surface shape of the transition region 73 can be such a shape that a high-pressure oil in the lubricating oil path flows into a connecting portion of the transition region 73 and the main cylinder portion 71, to a relief gap (a gap formed by the inner surface of the transition region 73, the inner surface of the crush relief portion 70 and the virtual inner circumferential surface). For example, the inner surface shape may include an outward protruding curved surface that protrudes to an outer diameter side, or may be a composite curved surface in an S-shape having an outward protruding curved surface on a side near to the crush relief portion 70 and an inward protruded curved surface on a side far from the crush relief portion 70. See FIG. 17.

Next, with reference to FIG. 7, specific dimensions of the crush relief portion 70 and the transition region 73 will be described. FIG. 7 is a development in which the inner circumferential surface of the main cylinder portion 71 is developed to be a flat surface (a straight line in a section).

A depth D1 at the circumferential end surface of a crush relief 70c may be similar to the conventional crush relief. Though the depth D1 depends on the specifications of an internal combustion engine, the depth D1 is about 0.01 to 0.05 mm, for example, in the case of a compact internal combustion engine bearing for a passenger car. Further, the crush relief 70c is preferably formed from the end portion in the circumferential direction of the half bearing to a range of a circumferential angle θ of 3° to 15° inclusive toward a central portion side in the circumferential direction, for an discharge operation of the high-pressure oil from an inside of the lubricating oil path to the relief gap (see FIGS. 2 and 7).

A depth D2 at a position of the crush relief portion 70 connecting to the transition region 73 can be set at 0.002 to 0.030 mm. If the depth D2 is within the range, (A) even in the region on the upstream side of the crush relief, the gap space in which the oil can disperse when the inlet opening 6c of the oil path 6a communicates with the transition region is formed in the vicinity of the connecting portion of the transition region 73 and the crush relief portion 70 (FIG. 14B), and (B) the pressure of the oil in the relief gap between a surface of the journal section 6 of the crankshaft and an inner surface of the crush relief portion 70 also becomes low in the upstream region. This is because when the oil having high pressure in the gap between the main cylinder surface and the journal portion surface advances into the relief gap of the invention of the present application in which a gap capacity is large (the gap capacity abruptly increases), the pressure of the oil is abruptly reduced at the same time. Therefore, the oil the pressure of which is high in a vicinity of the inlet opening 6c of the internal oil path 6a also especially disperses and flows to the relief gap from a gap between the transition region and the journal surface (FIG. 14A).

Note that when the depth D2 is less than 0.002 mm, the effect of reducing the pressure of the oil in the relief gap is reduced, and therefore, the high-pressure oil is difficult to disperse and feed to the relief gap. Further, when the depth D2 exceeds 0.030 mm, a gap (a gap sandwiched by the inner surface of the crush relief portion 70 and the virtual inner circumferential surface 71v) of the crush relief 70c in the end portion in the width direction of the half bearing 41 (or 42) is large, and therefore, a leakage amount of the lubricating oil to the outside from both end portions in the bearing width direction of the half bearing 41 (or 42) becomes large.

A length L2 in the circumferential direction, of the transition region 73 according to embodiment 1 is in a range of 1 to 4 mm, and is more preferably in a range of 2 to 3 mm.

The crush relief portion 70 according to embodiment 1 is formed in such a manner that the depth D1 at the position of the end surface 72 becomes deeper than the depth D2 at the position connecting to the transition region 73 as shown in FIGS. 6 and 7. Here, the depth of the crush relief 70c refers to a distance from the virtual inner circumferential surface 71v which is obtained by extending the inner circumferential surface of the main cylinder portion 71 over the crush relief portion 70 to the surface of the crush relief portion 70.

Furthermore, the crush relief 70c according to the present embodiment is formed by an outward protruding curved surface in an outward protruding shape in the radial direction of each of the half bearings 41 and 42. Namely, an inclination of the inner surface of the crush relief portion 70 with respect to the virtual inner circumferential surface 71v of the half bearing when seen from the axial direction of the half bearing is maximum at the position connecting to the transition region 73, is minimum at the position of the end surface 72, and is substantially parallel with the virtual inner circumferential surface 71v.

Note that shapes of the main cylinder portion 71, the crush relief portion 70 and the transition region 73 that are described above are measurable by an ordinary shape measuring instrument, for example, a roundness measuring instrument. Namely, in a state in which the bearing is assembled into the actual bearing housing section at the cylinder block lower part, or the housing similar thereto, the shape of the inner surface of the bearing can be measured continuously in the circumferential direction.

Figure 4:
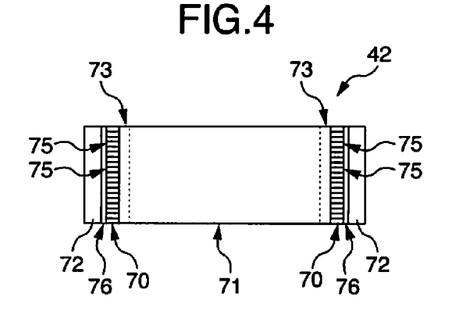
FIG. 4 is a bottom view of the other half bearing according to the embodiment of the invention of the present application.

In the crush relief portions 70, a plurality of crush relief grooves 74 and 75 are formed throughout an entire length in the circumferential direction of the inner circumferential surfaces of the crush relief portions 70 to extend parallel with the circumferential direction of the bearing, as shown in FIGS. 3 and 4. The plurality of crush relief grooves 74 and 75 are disposed parallel with one another in the width direction of the half bearings 41 and 42, and are formed throughout the entire width. Accordingly, a flat region is not present on the inner circumferential surfaces of the crush relief portions (except for a formation range of the oil groove 41a of the half bearing 41). Further, all of the plurality of crush relief grooves 74 and 75 are formed into the same groove widths and groove depths, and are also formed into the same groove widths and groove depths throughout the entire length in the circumferential direction of the circumferential surface of the crush relief portion 70.

Figure 8:
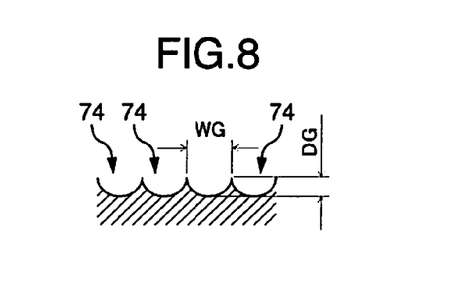
FIG. 8 is a sectional view of crush relief grooves.
Figure 9:
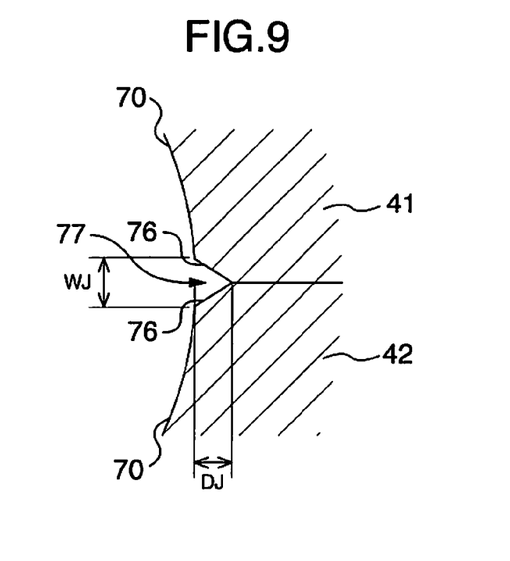
FIG. 9 is a sectional view of an axial groove.

Describing in more detail, the crush relief groove 74 is formed into a circular-arc shape (a shape in which a circular-arc portion is on a back side) with a predetermined groove width WG and a predetermined groove depth DG, as shown in FIG. 8. In other words, the individual crush relief grooves 74 are cut grooves each in a U-shape, provided in parallel at constant intervals (WG) in the width direction, and form a section in a saw-tooth shape or a shallow comb shape as a whole. Here, the groove width WG refers to the distance in the width direction of the half bearings 41 and 42 between apexes of adjacent peak portions, and the groove depth DG refers to a distance in a direction perpendicular to the inner circumferential surface from the apex to a bottom point of a valley portion. More specifically, the crush relief groove 74 preferably has the groove width WG of 0.05 to 0.5 mm, and the groove depth DG of 1 to 20 μm.

According to the invention of the present application, as shown in FIGS. 13A and 14A, the plurality of crush relief grooves 75 are formed throughout the entire length in the circumferential direction of the inner circumferential surface of the crush relief portion 70 to extend parallel with the circumferential direction of the bearing. When among the crush relief grooves 75 of the half bearing 42 on the lower side of FIG. 13A, for example, the crush relief grooves 75 on the right side of the page from the central portion in the axial direction of the half bearing 42 and the crush relief grooves on the left side of the page are inclined toward the central portion (the oil groove 41a of the half bearing 41 on the upper side) in the axial direction of the half bearing 42 (inclined with respect to the circumferential direction of the bearing), instead of the circumferential direction, unlike the invention of the present application, a vacancy (an bubble) generated in the relief gap is fed toward the central portion (the oil groove 41a side) in the axial direction of the half bearing 41 on the upper side, and therefore, is difficult to discharge to an outside of the bearing. Further, for example, when among the crush relief grooves 75 of the half bearing 42 on the lower side in FIG. 13A, the crush relief grooves 75 on the right side on the page from the central portion in the axial direction of the half bearing 42 and the crush relief grooves on the left side on the page are inclined toward the end portion in the axial direction of the half bearing 42, the leakage amount of the oil to the outside from the half bearing 41 becomes large.

Furthermore, as shown in FIGS. 3, 4, 6, 7 and 9, in the crush relief portions 70, inclined surfaces 76 that continuously extend in the axial direction of the half bearings 41 and 42 are formed at inner end edges in the circumferential direction of the half bearings 41 and 42. Namely, an axial groove 77 is formed along inner edges of the circumferential end surfaces 72 that abut on each other, and throughout the entire length of the width in the axial direction of the main bearing, in a state in which the pair of half bearings 41 and 42 are combined into a cylindrical shape. Note that unlike embodiment 1, the inclined surface 76 may be formed on only one end surface in the circumferential direction out of the two circumferential end surfaces 72 which abut on each other. In that case, when the pair of half bearings 41 and 42 are combined into the cylindrical shape, the inclined surface 76 forms the axial groove 77 in cooperation with the other circumferential end surface 72.

More specifically, the axial groove 77 preferably has a groove width WJ of 0.3 to 2 mm in the circumferential direction in the combined state, and a groove depth DJ in the radial direction of 0.1 to 1 mm. The axial groove 77 to be an exhaust path for the oil including vacancies (bubbles) can be in any size as long as passage of the oil including vacancies (bubbles) is enabled, and is not affected by the size of the bearing. Note that in FIG. 9, the groove with a V-shaped section is shown as the axial groove 77, but the sectional shape is not limited thereto as long as passage of the oil including vacancies (bubbles) is enabled.

The axial groove 77 is formed to be deeper than the crush relief groove 75. Therefore, an opening of the crush relief groove 75 at the end portion in the circumferential direction opens to an inner surface (the inclined surface 76) of the axial groove 77. Therefore, the oil including vacancies (bubbles) which flows by being guided by the inner surface recessed portion of the crush relief groove 74 directly advances into the axial groove 77, and therefore, an oil flow to the axial direction is easily formed in the axial groove 77. Accordingly, the oil including vacancies (bubbles) that advances into the axial groove 77 together with the lubricating oil is easily discharged outside the bearing.

The invention of the present application has an object to restrain cavitation erosion in the oil groove 41a by dispersing an oil flowing out of the inlet opening 6c and preventing the high-pressure oil from concentratedly flowing to the oil groove 41a of the half bearing 41, by the transition region 73 in the crush relief 70c on the rotation front side of the half bearing 42, and in order not to cause the high-pressure oil to flow to the half bearing 41, the crush relief grooves 74 and 75 are preferably disposed as follows.

Figure 10:
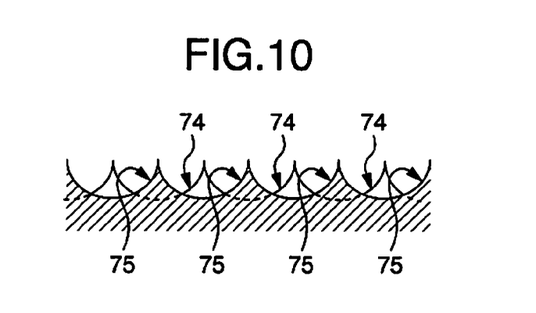
FIG. 10 is an explanatory view explaining positional relationship between paired crush relief grooves.

In the crush relief portion of the other half bearing 41 which is paired with the one half bearing 42, the plurality of crush relief grooves 74 that continue in the circumferential direction are provided. In the present embodiment, as shown in FIG. 10, the plurality of crush relief grooves 75 of the one half bearing 42 of the present embodiment are each displaced by a half of the groove width WG in the width direction, with respect to the plurality of crush relief grooves 74 of the other half bearing 41. Namely, in the butting portions of the circumferential end surfaces of the pair of half bearings 41 and 42, that is, a connecting position of the one crush relief groove 74 and the other crush relief groove 75 (actually are not directly connected because the axial groove 77 is present), the valley portion (an opening in a recessed shape of the crush relief groove) of the one crush relief groove 74 is disposed to correspond to the peak portion (the protruded shape formed between the two adjacent circumferential grooves 74) of the other crush relief groove 75.

Accordingly, since the vacancies (bubbles) generated in the oil receive resistance in the connecting position of the crush relief groove 74 and the crush relief groove 75, the vacancies (bubbles) that flow in the crush relief groove 75 of the one half bearing 42 hardly advance into the crush relief groove 74 of the other half bearing 41, and are easily discharged to the outside of the bearing by the oil flow that flows to the end portion side in the bearing width direction in the axial groove 77 at the same time. Note that the oil also receives resistance in the connecting position of the crush relief groove 74 and the crush relief groove 75, and also flows from the crush relief groove 75 to the crush relief groove 74.

Embodiment 2

Figure 11:
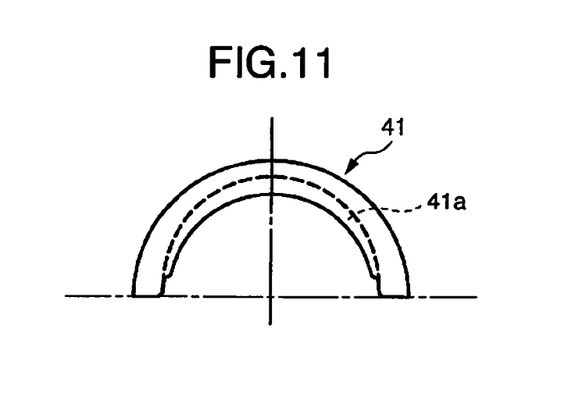
FIG. 11 is a front view of one half bearing according to another embodiment of the invention of the present application.
Figure 12:
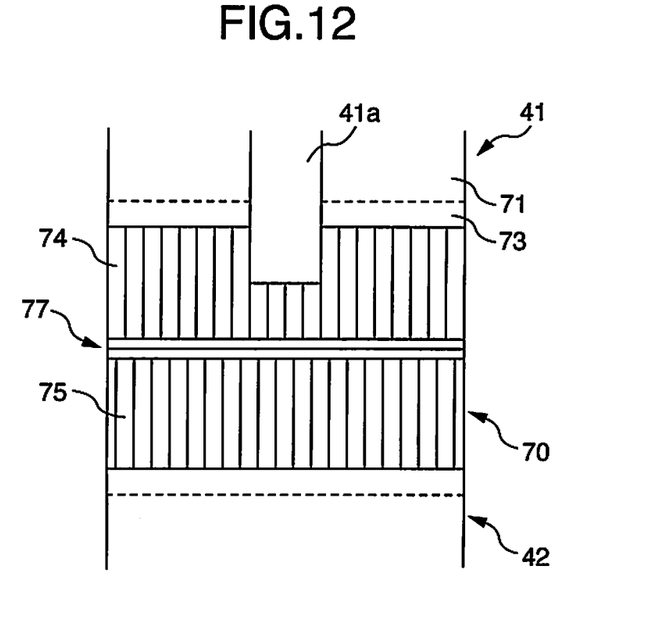
FIG. 12 is a view seen from a bearing inner side for explaining a pair of half bearings according to the other embodiment of the invention of the present application.

As shown in FIGS. 11 and 12, unlike the one half bearing 41 of embodiment 1, the oil groove 41a is formed in such a manner that a depth from the main cylinder surface becomes maximum in the central portion in the circumferential direction of the half bearing 41, and becomes gradually smaller toward both end portions in the circumferential direction.

Both end portions in the circumferential direction, of the oil groove 41a are positioned in the crush relief portion 70, and on a front side from the end portion in the circumferential direction of the oil groove 41a, a surface of the crush relief portion 70 having a plurality of crush relief grooves is formed. The other configuration is the same as the configuration of the half bearing 41 of embodiment 1.

In embodiment 2, as shown in FIG. 12, in the crush relief portion 70 of the other half bearing 42 which is paired with the one half bearing 41, a plurality of crush relief grooves 75 extending in the circumferential direction are provided. The plurality of crush relief grooves 74 of the one half bearing 41 of the present embodiment are each displaced by a half of the groove width WG in the width direction with respect to each of the plurality of crush relief grooves 75 of the other half bearing 42. Therefore, vacancies (bubbles) in the oil that are generated in the crush relief 70c of the half bearing 42 are restrained from flowing into the half bearing 41 at the other party. Furthermore, since the oil groove 41a does not communicate with the axial groove 77, the vacancies (bubbles) do not directly advance into the oil groove 41a. Therefore, the vacancies (bubbles) are easily discharged to the outside of the bearing by oil flow that flows to the end portion side in the bearing width direction, in the axial groove 77.

While each of embodiment 1 and embodiment 2 shows the example in which the plurality of crush relief grooves 74 of the one half bearing 41 are each displaced by a half of the groove width WG in the width direction with respect to the plurality of crush relief grooves 75 of the other half bearing 42, the invention of the present application is not limited thereto. The plurality of crush relief grooves 74 may be displaced within a range that exceeds zero and is less than the groove width WG in the width direction, with respect to the plurality of crush relief grooves 75 of the other half bearing 42. In other words, the crush relief groove 74 on one side and the crush relief groove 75 on the other side can be disposed by the positions of the respective central portions in the groove widths are displaced in the width direction in a range which exceeds at least zero and is less than the groove width WG at the maximum in the connecting position. Further, more preferably, the crush relief groove 74 on the one side and the crush relief groove 75 on the other side are disposed in such a manner that the respective positions of the central portions in the groove widths are displaced in the width direction of the half bearing 41 in a range of at least 10% of the groove width WG to 50% inclusive of the groove width WG at the maximum in the connecting position. However, the crush relief groove 74 and the crush relief groove 75 may conform to each other, though discharge performance for vacancies is slightly low.

While the embodiments of the invention of the present application are described in detail with reference to the drawing, the specific configuration is not limited to the embodiments, and design changes to the extent without departing from the gist of the invention of the present application are included in the invention of the present application.

For example, in each of the embodiments, the case in which the plurality of crush relief grooves 75 are provided at only the crush relief portion 70 is described, but a plurality of circumferential grooves may be provided in the main cylinder surface. Further, a plurality of circumferential grooves may be provided in the transition region 73. Furthermore, a region where the bearing wall thickness decreases (a crowning portion) may be provided on the inner circumferential surface sides of both the end portions in the axial direction of the half bearings 41 and 42.

The invention claimed is:

1. A main bearing for rotatably supporting a journal section of a crankshaft of an internal combustion engine, the journal section comprising a cylindrical body part, a lubricating oil path extending to penetrate the cylindrical body part, and two inlet openings of the lubricating oil path that are formed on an outer circumferential surface of the cylindrical body part, wherein the main bearing consists of a first half bearing and a second half bearing which are combined into a cylindrical shape by butting respective circumferential end surfaces, the first and second half bearings are configured to form an axial groove extending through an entire length of the main bearing in an axial direction on an inner circumferential surface side of each butting portion when the first and second half bearings are combined, each half bearing has a main cylinder portion including a central portion of the half bearing in the circumferential direction, and crush relief portions which are formed throughout an entire length of the half bearing in the axial direction at both end portions of the half bearing in the circumferential direction so that a wall thickness of the crush relief portion becomes thinner than that of the main cylinder portion, each crush relief portion extending from the end surface of the half bearing in the circumferential direction toward the central portion in the circumferential direction with a center angle not less than 3° and not more than 15°, each crush relief portion is formed by an outward protruding curved surface in a protruding shape protruding outward in the radial direction seen from the axial direction of the half bearing, a plurality of crush relief grooves extending in the circumferential direction through an entire length of the crush relief portion are formed in each crush relief portion to communicate with the axial groove, an oil groove is formed only on an inner circumferential surface of the first half bearing among the first and second half bearings, the oil groove extending in the circumferential direction through at least an entire length of the main cylinder portion of the first half bearing, and the second half bearing further has a transition region formed between at least the crush relief portion on a front side of the crankshaft in a rotation direction and the main cylinder portion such that a wall thickness of the transition region becomes thinner toward the crush relief portion from the main cylinder portion, the transition region comprising an inward protruding curved surface in a protruding shape protruding inward in a radial direction seen from the axial direction of the half bearing.

2. The main bearing according to claim 1, wherein the crush relief portion connecting to the transition region has a depth of 0.002 mm to 0.030 mm in a radial direction at the connecting position.

3. The main bearing according to claim 1, wherein the transition region has a length of 1 mm to 4 mm in the circumferential direction.

4. The main bearing according to claim 1, wherein each crush relief groove has a depth of 1 μm to 20 μm in the radial direction, and a width of 0.05 mm to 0.5 mm in the axial direction.

5. The main bearing according to claim 1, wherein when the first and second half bearings are combined, the respective crush relief grooves formed in the crush relief portions of the first half bearing are adapted to be displaced in the axial direction with respect to the respective crush relief grooves formed in the crush relief portions of the second half bearing by an amount exceeding zero at a minimum and less than the width of the crush relief groove at a maximum.

6. The main bearing according to claim 1, wherein each axial groove has a depth of 0.1 mm to 1 mm in the radial direction, and a width of 0.3 mm to 2.0 mm in the circumferential direction.

7. The main bearing according to claim 1, wherein the transition region has the inward protruding curved surface on a side far from the crush relief portion, and further has an outward protruding curved surface in a protruding shape protruding outward in the radial direction on a side near to the crush relief portion.

8. The main bearing according to claim 1, wherein at least a circumferential end portion of the oil groove on a front side in the rotation direction of the crankshaft is located in the crush relief portion.

9. A main bearing for rotatably supporting a journal section of a crankshaft of an internal combustion engine, the journal section comprising a cylindrical body part, a lubricating oil path extending to penetrate the cylindrical body part, and two inlet openings of the lubricating oil path that are formed on an outer circumferential surface of the cylindrical body part, wherein the main bearing consists of a first half bearing and a second half bearing which are combined into a cylindrical shape by butting respective circumferential end surfaces, the first and second half bearings are configured to form an axial groove extending through an entire length of the main bearing in an axial direction on an inner circumferential surface side of each butting portion when the first and second half bearings are combined, each half bearing has a main cylinder portion including a central portion of the half bearing in the circumferential direction, and crush relief portions which are formed throughout an entire length of the half bearing in the axial direction at both end portions of the half bearing in the circumferential direction so that a wall thickness of the crush relief portion becomes thinner than that of the main cylinder portion, each crush relief portion extending from the end surface of the half bearing in the circumferential direction toward the central portion in the circumferential direction with a center angle not less than 3° and not more than 15°, a plurality of crush relief grooves extending in the circumferential direction through an entire length of the crush relief portion are formed in each crush relief portion to communicate with the axial groove, an oil groove is formed only on an inner circumferential surface of the first half bearing among the first and second half bearings, the oil groove extending in the circumferential direction through at least an entire length of the main cylinder portion of the first half bearing, and the second half bearing further has a transition region formed between at least the crush relief portion on a front side of the crankshaft in a rotation direction and the main cylinder portion such that a wall thickness of the transition region becomes thinner toward the crush relief portion from the main cylinder portion, the transition region comprising an inward protruding curved surface in a protruding shape protruding inward in a radial direction seen from the axial direction of the half bearing, wherein the transition region has the inward protruding curved surface on a side far from the crush relief portion, and further has an outward protruding curved surface in a protruding shape protruding outward in the radial direction on a side near to the crush relief portion.

* * * * *